United States Patent
Schabbach (10) Patent No.: US 12,482,545 B2
(45) Date of Patent: Nov. 25, 2025

(54) PORTABLE MEDICAL MEMORY

(71) Applicant: SANOFI, Paris (FR)

(72) Inventor: Michael Schabbach, Frankfurt am Main (DE)

(73) Assignee: Sanofi, Paris (FR)

( * ) Notice: Subject to any disclaimer, the term of this patent is extended or adjusted under 35 U.S.C. 154(b) by 161 days.

(21) Appl. No.: 16/956,185

(22) PCT Filed: Dec. 18, 2018

(86) PCT No.: PCT/EP2018/085388
§ 371 (c)(1),
(2) Date: Jun. 19, 2020

(87) PCT Pub. No.: WO2019/121609
PCT Pub. Date: Jun. 27, 2019

(65) Prior Publication Data
US 2020/0342973 A1    Oct. 29, 2020

(30) Foreign Application Priority Data

Dec. 21, 2017    (EP) .................................... 17306872

(51) Int. Cl.
*G16H 20/13*     (2018.01)
*A61J 7/04*      (2006.01)
(Continued)

(52) U.S. Cl.
CPC ............ *G16H 20/13* (2018.01); *A61J 7/0418* (2015.05); *G16H 20/17* (2018.01); *G16H 40/63* (2018.01); *G16H 40/67* (2018.01); *A61J 2205/60* (2013.01)

(58) Field of Classification Search
CPC ........ G16H 10/00; G16H 10/40; G16H 15/00; G16H 20/00; G16H 20/10; G16H 20/13;
(Continued)

(56) References Cited

U.S. PATENT DOCUMENTS

2006/0069814 A1    3/2006  Abraham et al.
2006/0219776 A1*  10/2006  Finn ..................... G06K 7/0043
                                                         235/380
(Continued)

FOREIGN PATENT DOCUMENTS

CN    101233476 A    7/2008
CN    101546362 A    9/2009
(Continued)

OTHER PUBLICATIONS

Sardini et al. 2009, "Passive and self-powered autonomous sensors for remote measurements." Sensors (Basel, Switzerland) vol. 9,2 (2009): 943-60. doi:10.3390/s90200943.*
(Continued)

*Primary Examiner* — Robert W Morgan
*Assistant Examiner* — Charles P Coleman
(74) *Attorney, Agent, or Firm* — Fish & Richardson P.C.

(57) ABSTRACT

A portable medical memory device includes a battery; a non-volatile memory; and a near field communication transceiver. The device is configured to: transfer power from the battery to a medical device via the near field communication transceiver to trigger a measurement by a sensor of the medical device; read sensor data obtained by the measurement from the medical device using the near field communication transceiver; and store the sensor data in the non-volatile memory.

10 Claims, 3 Drawing Sheets

(51) Int. Cl.
*G16H 20/17* (2018.01)
*G16H 40/63* (2018.01)
*G16H 40/67* (2018.01)

(58) Field of Classification Search
CPC ........ G16H 20/17; G16H 30/00; G16H 40/00;
G16H 50/00; G16H 70/00; G16H 80/00;
G16H 40/67; G16H 40/63; G06Q
50/22–24; A61J 7/0418; A61J 2205/60
USPC ............................ 222/639, 389; 705/2, 3, 20
See application file for complete search history.

(56) References Cited

U.S. PATENT DOCUMENTS

| | | | |
|---|---|---|---|
| 2008/0103554 | A1 | 5/2008 | Dicks et al. |
| 2009/0248437 | A1 | 10/2009 | Gucciardi et al. |
| 2009/0289936 | A1* | 11/2009 | Sheedy .................. G06Q 30/02 345/59 |
| 2011/0010275 | A1 | 1/2011 | Hull |
| 2011/0160802 | A1* | 6/2011 | Rofougaran ........... G16H 10/65 607/60 |
| 2015/0161339 | A1 | 6/2015 | Teucher et al. |
| 2015/0205343 | A1 | 7/2015 | Thomas, III et al. |
| 2016/0015267 | A1* | 1/2016 | Bernstein ............... G16H 40/63 600/347 |
| 2016/0262619 | A1* | 9/2016 | Marcus .................. A61B 5/259 |
| 2016/0331232 | A1* | 11/2016 | Love ..................... A61B 5/0022 |
| 2017/0147787 | A1 | 5/2017 | Albrecht et al. |
| 2017/0235919 | A1 | 8/2017 | Bauss et al. |
| 2017/0244285 | A1* | 8/2017 | Raj ...................... A61B 5/0024 |
| 2017/0259072 | A1* | 9/2017 | Newham ............ A61N 1/37276 |
| 2020/0246546 | A1* | 8/2020 | Bauss .................... G16H 20/17 |
| 2020/0342973 | A1* | 10/2020 | Schabbach ............ A61J 7/0418 |
| 2022/0068473 | A1* | 3/2022 | Miller .................... G16H 40/67 |
| 2023/0000350 | A1* | 1/2023 | Cole ....................... A61B 5/002 |
| 2023/0372611 | A1* | 11/2023 | Srinivasan ........ A61M 5/14248 |

FOREIGN PATENT DOCUMENTS

| | | |
|---|---|---|
| CN | 101601041 A | 12/2009 |
| CN | 102473276 A | 5/2012 |
| CN | 104508588 A | 4/2015 |
| JP | 2013-517091 | 5/2013 |
| JP | 2013-114291 | 6/2013 |
| JP | 2016-505808 | 2/2016 |
| JP | 2016-534767 | 11/2016 |
| JP | 2017-500900 | 1/2017 |
| WO | WO 2011/090869 | 7/2011 |
| WO | WO 2014/070254 | 5/2014 |
| WO | WO 2014/209657 | 12/2014 |
| WO | WO 2015/055715 | 4/2015 |
| WO | WO 2016/097462 A1 | 6/2016 |

OTHER PUBLICATIONS

Patil et al. 2014, "NFC based health monitoring and controlling system," 2014 IEEE Global Conference on Wireless Computing & Networking (GCWCN), Lonavala, India, 2014, pp. 133-137, doi: 10.1109/GCWCN.2014.7030864.*
Majumder et al. 2017, "Wearable Sensors for Remote Health Monitoring." Sensors (Basel, Switzerland) vol. 17,1 130. Jan. 12, 2017, doi:10.3390/s17010130.*
Ondiege et al. 2017, "Investigating User Identification in Remote Patient Monitoring Devices." Bioengineering (Basel, Switzerland) vol. 4,3 76. Sep. 13, 2017, doi:10.3390/bioengineering4030076.*
PCT International Preliminary Report on Patentability in International Appln. No. PCT/EP2018/085388, dated Jun. 23, 2020, 9 pages.
PCT International Search Report and Written Opinion in International Appln. No. PCT/EP2018/085388, dated Mar. 8, 2019, 12 pages.
Wikipedia.com [online], "Near-field communication," Dec. 13, 2017, Retrieved on Jun. 15, 2018, retrieved from URL<https://en.wikipedia.org/wiki/Near-field_communication>, 17 pages.
Wikipedia.com [online], "Non-volatile memory," Nov. 6, 2017, Retrieved on Jun. 15, 2018, retrieved from URL<https://en.wikipedia.org/wiki/Non-volatile memory>, 5 pages.
Kassiri et al., "Electronic sleep stage classifiers: A survey and VLSI design methodology," IEEE transactions on biomedical circuits and systems, Jun. 16, 2016, 11(1):177-188.
Mei, "Computer Assembly, Maintenance, and Repair Tutorial," China Railway Press, Oct. 31, 2009, p. 49 (with English translation).
Wang et al., "Strategy and Practice of informationization in Universities in the Era of Big Data," Tohoku University Press, May 31, 2016, pp. 118-119 (with English translation).
Zhang et al., "A Wearable Wireless Body Sensor for Epileptic Seizure Prediction," Chinese Journal of Medical Instrumentation, 2016, 40(4):257-259 (English abstract only).

* cited by examiner

PORTABLE MEDICAL MEMORY

CROSS REFERENCE TO RELATED APPLICATIONS

The present application is the national stage entry of International Patent Application No. PCT/EP2018/085388, filed on Dec. 18, 2018, and claims priority to Application No. EP 17306872.7, filed on Dec. 21, 2017, the disclosures of which are incorporated herein by reference.

TECHNICAL FIELD

The application relates to a portable medical memory device, in particular, although not exclusively, to a portable device for storing medical data obtained from sensors in medical devices, and to a method.

BACKGROUND

Medical devices are increasingly including sensors, allowing them to collect data relating to their function. The data collected by these sensors can be analysed to provide useful information relating to a user of the medical device and the functioning of the medical device.

SUMMARY

A first aspect of the disclosure provides a portable medical memory device including a battery, a non-volatile memory, and a near field communication transceiver. The device is configured to transfer power from the power source to a medical device via the near field communication transceiver to trigger a measurement by a sensor of the medical device, read sensor data obtained by the measurement from the medical device using the near field communication transceiver, and store the sensor data in the non-volatile memory.

The device may be configured to respond to a request received at the near field communication transceiver from an external device to send the sensor data stored in the non-volatile memory to the external device in reply to the request.

The device further includes a network interface and the device may be configured to send the stored measurement data to an external device through the network interface.

The sensor data may include metadata relating to the sensor measurement. The metadata may comprise at least one of: a data of the measurement; a time of the measurement; or an identity of the medical device.

The device may be configured to supply power from the power source to the medical device sensor for performing the measurement.

The device may further include a status indicator configured to indicate at least one of: a successful reading of the sensor data by the device; an unsuccessful reading of the sensor data by the device; a successful transfer of sensor data to an external device; or an unsuccessful transfer of sensor data to an external device.

The near field communication transceiver may be an RFID reader.

The device may be in the form of a keyring attachment.

A second aspect of the disclosure provides a method of collecting and storing medical sensor data from a medical device, including transferring power from a portable medical memory device to the medical device using near field communication to trigger a measurement by a sensor of the medical device, reading sensor data obtained by the medical device using the portable medical memory device, storing the measurement data in a memory in the portable medical memory device.

The method may further include tagging the measurement data with metadata relating to the measurement and storing the metadata in the memory in the portable medical memory device.

The metadata may comprise at least one of: a data of the measurement; a time of the measurement; or an identity of the medical device.

The transferred power may be used to provide power to the medical sensor for performing the measurement.

The method may further include establishing a data connection between the portable medical memory device and a data processing device, and transferring the measurement data from the memory in the portable medical memory device to the data processing device via the data connection. The device is configured to respond to a request received at the near field communication transceiver from an external device to send the sensor data stored in the non-volatile memory to the external device in reply to the request.

The method may further include sending the stored measurement data to an external device through a network interface These and other aspects will be apparent from and elucidated with reference to the embodiments described hereinafter.

BRIEF DESCRIPTION OF THE FIGURES

Embodiments will now be described, by way of example only, with reference to the accompanying drawings, in which.

DETAILED DESCRIPTION

Embodiments provide an apparatus, system and method for capturing and storing medical data collected by medical devices and/or sensors in medical devices.

Medical devices may contain passive sensors to measure parameters associated with the medical device and its use. The passive sensors may use external devices to aid the measurement, such as a smartphone. These external devices may communicate to the passive sensor using radio frequency identification (RFID), such as near field communication (NFC). The external devices may provide power to the passive sensor wirelessly to enable it to carry out a measurement. Once the measurement is taken by the passive sensor, it can be transmitted to the external device for further processing and/or storage.

An example of the use of such a sensor is a determination of the content of a medicament (drug) cartridge. The content can be determined based on a capacitive measurement using, for example two electrodes attached within the cartridge. A liquid in the cartridge acts as a dielectric. Variation in the liquid properties, such as the amount present, can cause a different value for the capacitance to be measured.

The results of such measurements can provide valuable data relating to a user medical activity. For example, by measuring the amount of a medication in a drug cartridge over time, a dose history for that medication can be created. This can also help track the compliance of a user with a medication regime. Taking measurements after each use of the drug cartridge may therefore be beneficial for monitoring the use of the drug by a user.

Further processing of the results of these measurements may provide additional useful information for guiding therapy. Typically, the medical devices lack the capacity to process the measured data. Transferring the data to a data processing device, such as a personal computer or a smart phone, for processing can provide the processing capability blacking in the medical device or sensor on the medical device. However, it may not always be possible or convenient to transfer the measured data straight to a data processing device. For example, if the data processing device is a smartphone, then it may not be present with a user when the user is using the medical device, or may be out of battery power.

Instead, a portable medical memory device may be used that may act as a temporary store of the data until it can be transmitted to the data processing device at a more convenient time. A user may use the device to capture and store measurement data taken by sensors on the medical device for later transfer to a data processing device.

Figure 1:
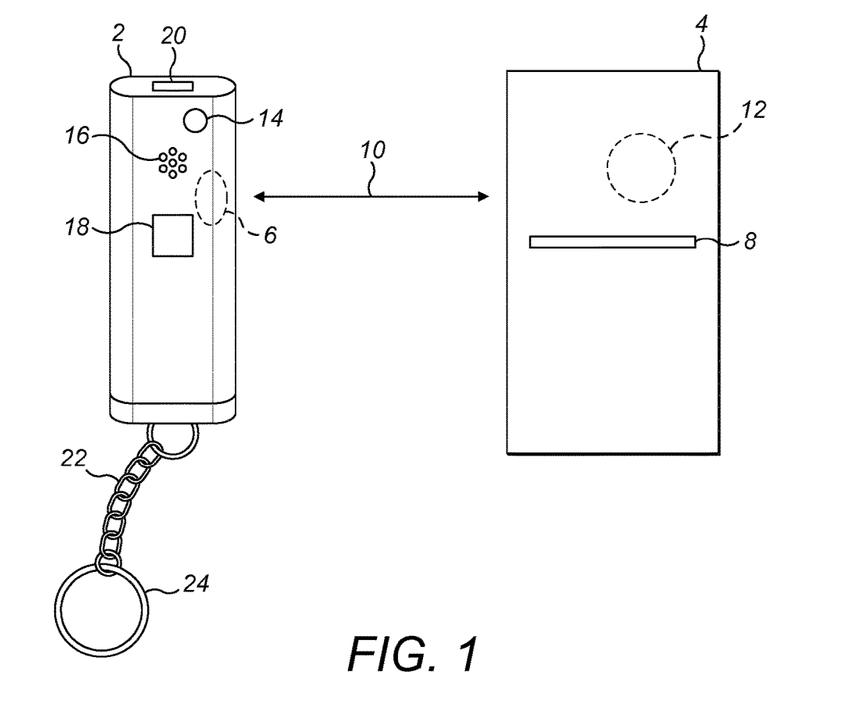
FIG. 1 is an example of a portable medical memory device according to embodiments.

FIG. 1 shows an example of a portable medical memory device according to embodiments. The portable medical memory device 2 is used to read and store measurement data collected from a medical device 4 for later transmission to a further external device for data processing. The portable medical memory device 2 may be sufficiently small to be carried conveniently by a user.

The portable medical memory device 2 comprises a near field communication (NFC) transceiver 6 (also referred to as an NFC interrogator). The NFC transceiver comprises an antenna for transmitting and receiving radio frequency signals. The NFC transceiver 6 may, in some embodiments, be in the form of an active NFC tag. The NFC transceiver 6 is operable to communicate wirelessly with nearby NFC transceivers, including radio frequency identifier (RFID) tags.

The memory device 2 further comprises a memory (not shown). The memory can be used to store measurement data transferred to the memory device 2 from one or more sensors 8 in the medical device 4.

The memory device 2 comprises a power source (not shown). The power source may be in the form of a battery. The battery may be rechargeable. The battery can be used to power the memory device 2. It may also be used to power sensors 8 in the medical device 4 by wireless transmission 10 via the NFC transceiver 6.

In use, the medical memory device 2 is configured to transfer power from the power source to one or more medical device sensors 8 in the medical device 4. This may be done by wirelessly transmitting 10 the power from the NFC transceiver 6 to an RFID tag 12 in the medical device 4. The power transfer 10 is used by the sensor 8 to trigger a measurement.

The results of the measurement are then read by the NFC transceiver 6 via the RFID tag 12 in the medical device 4. The memory device 2 then stores the measurement data in the memory of the memory device 2.

The RFID tag 12 in the medical device 4 may, in some embodiments, be a passive RFID tag. In these embodiments, power for the sensor 8 to perform a measurement may be supplied wirelessly by the NFC transceiver 6 in the memory device 2.

In some embodiments the medical device 4 may comprise a power source for the sensor 8. In these embodiments, the NFC transceiver 6 will trigger the measurement by the sensor, but not supply power for the measurement.

In some embodiments, the memory device 2 may comprise a status indicator. The status indicator provides feedback to the memory device 2 user to indicate whether the memory device 2 is functioning correctly. For example, the status indicator may be in the form of a visual indicator such as a light 14. The light 14 may change colour in dependence on whether measurement data has been successfully captured from the medical device 4 and/or successfully transferred to an external data processing device. For example a green light may be used to indicate a successful measurement data capture and/or transfer. A red light may be used to indicate an unsuccessful data capture and/or transfer.

The status indicator may alternatively or additionally be in the form of an acoustic indicator such as a speaker 16. The speaker 16 may emit a sound in the event of a successful and/or unsuccessful measurement data capture by the memory device 2. For example, the speaker 16 may emit a "beep" when measurement data has been successfully captured or transferred. A different "beep" may be used to indicate a failed data capture or transfer. For example, the beep may have a different tone, a different duration, and/or contain a different number of distinct "beeps".

In some embodiments, the status indicator may be in the form of a haptic feedback system (not shown). For example, the memory device 2 may contain a vibrator, e.g. a piezoelectric vibrator, for making the memory device 2 vibrate. Vibration pulses may be used to indicate a successful or unsuccessful data capture or transfer. For example, the number of vibration pulses, the duration of the vibration, and/or the intensity of the vibration may be used to distinguish a successful data capture or transfer from an unsuccessful one.

The memory device 2 may, in some embodiments, be provided with a key or button 18 for activating the memory device 2.

The device 2 may further comprise a network interface 38. The network interface 38 may be used to communicate with a further external device, such as a smart phone. For example, the network interface 38 may be used to transmit measurement data stored in the memory device 2 memory to a further external device. The further external device may be a data processing device operable to process the measurement data.

The network interface 38 may be provided in the form of a wireless network interface (not shown). The wireless network interface may be provided by any of: Bluetooth; Wi-Fi; Radio Frequency (RF); Near Field Communication (NFC); Infrared (IR), such as using an Infrared Data Association (IRDA) protocol; or acoustically. In some embodiments, the memory device 2 may communicate with the further device using the NFC transceiver 6.

Alternatively or additionally, the network interface may be provided in the form of a physical port 20 on the memory device 2. The port 20 may facilitate a wired (electrical) connection between the further external device and the memory device 2. The port 20 may be in the form of a USB port. The port 20 may also act as a means through which the battery of the memory device 2 can be recharged.

In the example shown, the memory device is provided as a keyring attachment attached to a keyring 24. A chain 22 links the memory device 2 to a split ring of the keyring 24. This allows for the memory device 2 to be conveniently transported by the device user. However it will be recognised that many other alternatives are possible. For example the memory device 2 may be provided as part of a wristwatch. It may be provided as an implant within the body of the user. It may be provided in the form of a "smart card", allowing for the memory device 2 to be easily stored in the user's wallet or purse.

Figure 2:
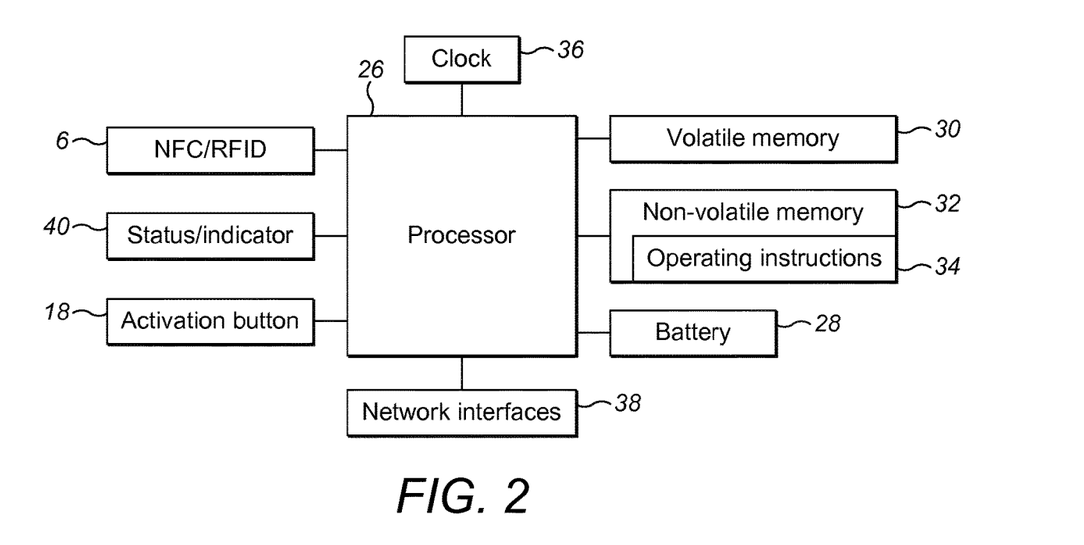
FIG. 2 is a schematic representation of the electronics system of the device of FIG. 1.

With respect to FIG. 2, a schematic representation of the electronics system of the apparatus according to the first embodiment is shown. The electronics system comprises a processor arrangement 26. The processor arrangement 26 and other hardware components may be connected via a system bus (not shown). Each hardware component may be connected to the system bus either directly or via an interface. A battery 28 is arranged to provide power to the electronics system. Said battery may be rechargeable.

The processor arrangement 26 controls operation of the other hardware components of the electronics system. The processor arrangement 26 may be an integrated circuit of any kind. The processor arrangement 26 may for instance be a general purpose processor. It may be a single core device or a multiple core device. The processor arrangement 26 may be a central processing unit (CPU) or a general processing unit (GPU). Alternatively, it may be a more specialist unit, for instance a RISC processor or programmable hardware with embedded firmware. Multiple processors may be included. The processor arrangement may be termed processing means.

The electronics system may comprise a working or volatile memory 30. The processor arrangement 26 may access the volatile memory 30 in order to process data and may control the storage of data in memory. The volatile memory 30 may be a RAM of any type, for example Static RAM (SRAM), Dynamic RAM (DRAM), or it may be Flash memory, such as an SD-Card. Multiple volatile memories may be included, but are omitted from the Figure.

The electronics system comprises a non-volatile memory 32. The non-volatile memory 32 stores a set of operation instructions 34 for controlling the normal operation of the processor arrangement. The non-volatile memory 32 may be a memory of any kind such as a Read Only Memory (ROM), a Flash memory or a magnetic drive memory. Other non-volatile memories may be included, but are omitted from the Figure.

The processor arrangement 26 operates under the control of the operating instructions 34. The operating instructions 34 may comprise code (i.e. drivers) relating to the hardware components of the electronics system, as well as code relating to the basic operation of the apparatus. The operating instructions may also cause activation of one or more software modules stored in the non-volatile memory 32. Generally speaking, the processor arrangement 26 executes one or more instructions of the operating instructions 34, which are stored permanently or semi-permanently in the non-volatile memory 32, using the volatile memory 30 temporarily to store data generated during execution of the operating instructions 34.

The processor arrangement 26, the volatile memory 30 and the non-volatile memory 32 may be provided as separate integrated circuit chips connected by an off-chip bus, or they may be provided on a single integrated circuit chip. The processor arrangement 26, the volatile memory 30 and the non-volatile memory 32 may be provided as a microcontroller.

The electronics system comprises a clock 36. The clock 36 may be a clock crystal, for example, a quartz crystal oscillator. The clock 36 may be a separate component to the processor arrangement 26 which is configured to provide a clock signal to the processor arrangement 26. The processor arrangement 26 may be configured to provide a real time clock based on the signal from the clock 36. Alternatively, the clock 36 may be a clock crystal which is provide on a single integrated circuit chip with the processor arrangement 26.

The electronics system may comprise the one or more network interfaces 38. The network interfaces 38 facilitate the connection of the apparatus to one or more computer networks and the bi-directional exchange of information between the memory device and other members of the networks. These networks may include the Internet, a Local Area Network, or any other network required by the apparatus to communicate with the data centre and/or contact centre. The network interfaces 38 comprise a network interface controller, such as an Ethernet adaptor, a Wi-Fi adaptor and/or a Bluetooth adaptor. The network interfaces 38 are associated with one or more network addresses for identifying the apparatus on the network. The one or more network addresses may be in the form of an IP address, a MAC address, and/or an IPX address.

The electronics system comprises the NFC transceiver 6. The NFC transceiver 6 constitutes a radio frequency transceiver. The transceiver may be used to transmit power and data to the RFID tag 12 in the medical device and to receive data from the RFID tag in response. In some embodiments, the NFC transceiver 6 is in the form of a RFID reader or RFID interrogator. Upon receipt of data from the RFID tag 12, the NFC transceiver 6 may pass the received data to the processing arrangement 26. The processing arrangement 26 can process the received data and store it in the non-volatile memory 32 of the system for later retrieval. In some embodiments, the processing performed by the processing arrangement 26 comprises tagging the measured data with metadata before storage. For example, the measurement data may be tagged with the date and time of the measurement and/or the identity of the medical device from which the measurement was taken.

The electronics system may comprise one or more status indicators 40. The status indicators 40 may indicate the system status to a user. For example, the status indicator may indicate when data has been successfully transferred from a sensor in a medical device. The status indicator 40 may also indicate when data has been successfully transferred from the non-volatile memory 32 to an external device, for example via the network interface 38.

In some embodiments, the system comprises an activation button 18. The activation button 18 may act as a switch for turning the memory device on and off. The activation button 18 may act as a means of initiating data capture and/or data transfer by the memory device.

Figure 3:
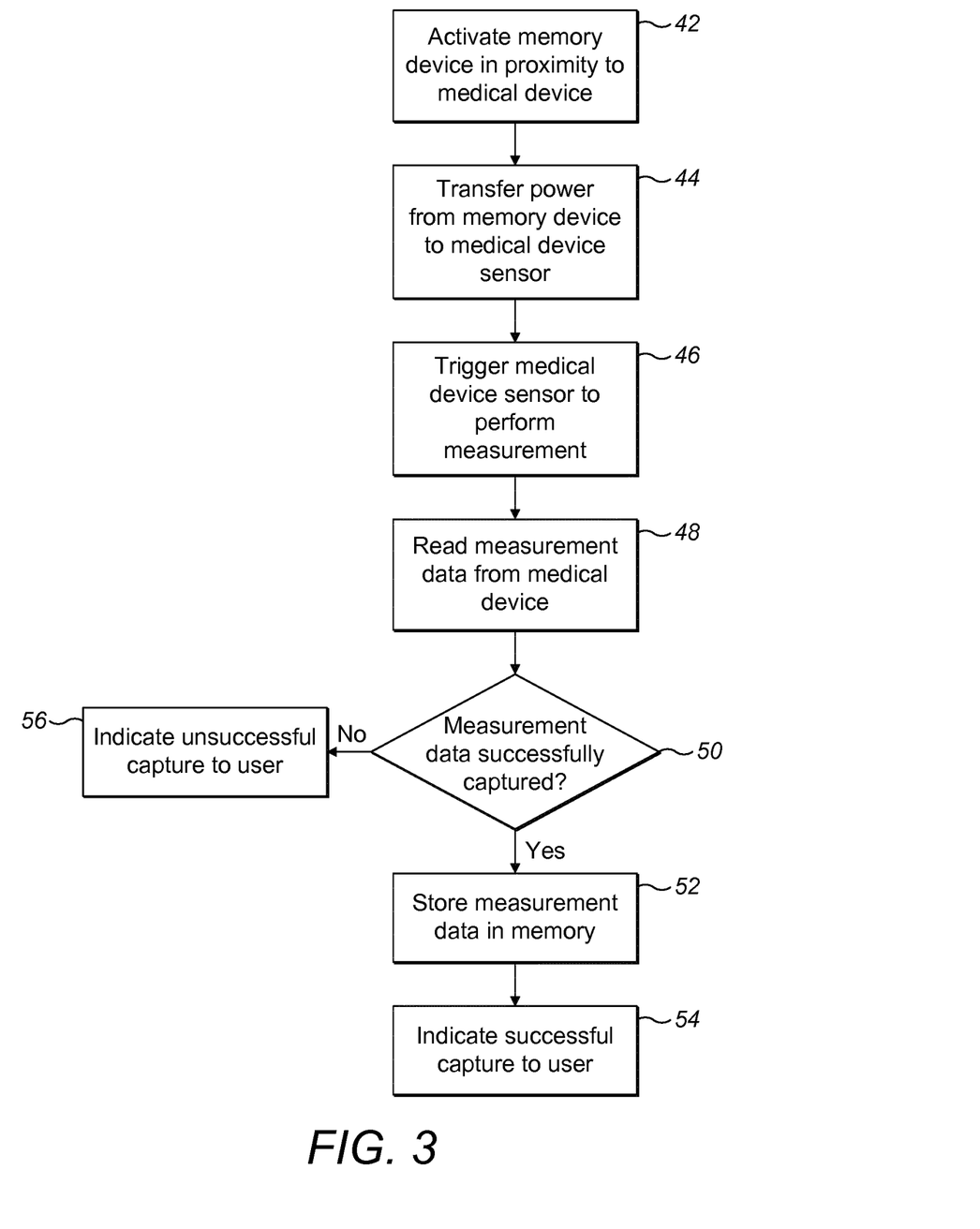
FIG. 3 shows a flowchart illustrating an example of a data capture process performed by the device of FIG. 1.

FIG. 3 shows a flowchart illustrating an example of a data capture process by the memory device.

The memory device 2 is initially brought into proximity with the RFID tag 12 on the medical device 4. The user then activates 42 the memory device 2. The activation may be achieved by pressing an activation key or button 18 on the memory device. In some embodiments, the user may hold down the activation key or button 18 throughout the whole data capture process.

The activation 42 of the memory device 2 causes power to be supplied from the battery 28 of the memory device 2 to the electronic systems of the memory device 2. The NFC transceiver 6 transfers power 44 from the memory device 2 via the RF antenna to the RFID tag 12 in the medical device 4. The power is communicated by inductive coupling between the RF antenna of the memory device 2 and the antenna of the RFID tag 12 of the medical device 4. In some embodiments, commands, represented by specific data, are also transferred from the memory device 2 to the RFID tag 12 in the medical device 4.

The power transfer 44 acts as a trigger 46 for a sensor 8 in the medical device 4 to perform a measurement. In embodiments where the sensor 8 is passive, the transferred power may be used to provide power to the sensor 8 for performing the measurement.

Once the measurement has been performed, the resulting measurement data is read 48 by the NFC transceiver 6 in the memory device. The NFC transceiver 6 may interrogate the RFID tag 12 in the medical device 4 and receive in return the measurement data. The NFC transceiver 6 may additionally receive a medical device identifier from the RFID tag 12.

The memory device 2 then checks if the measurement data has been successfully captured 50.

If the measurement data has been successfully captured then the memory device 2 stores 52 the measurement data in its non-volatile memory 32. The measurement data may be tagged with metadata relating to the measurement. The measurement data may be stored along with the metadata relating to it. The metadata may include, for example, the date and time that the measurement was taken and/or the identity of the medical device 4 on which the measurement was taken. The memory device 2 may then indicate to the user that the data capture process has been successful 54. The indication may comprise a visual indication, such as a light 14 on the memory device 2 changing colour. For example, a light 14 on the memory device 2 may flash green to indicate successful data capture. The indication may comprise an aural indication provided by a speaker 16 on the memory device 2, such as a "bleep".

If the measurement data has not been successfully captured, then an indication is provided to the user that the data capture has failed. The indication may comprise a visual indication, such as a light 14 on the memory device 2 changing colour. For example, a light 14 on the memory device 2 may flash red to indicate successful data capture. The indication may comprise an aural indication provided by a speaker 16 on the memory device 2, such as a "bleep". In some embodiments, an aural indication may be provided for an unsuccessful capture that is different from the aural indication for a successful capture. For example, a "bleep" of a different tone may be provided in each case, or a different sequence of audio signals may be provided in each case.

Figure 4:
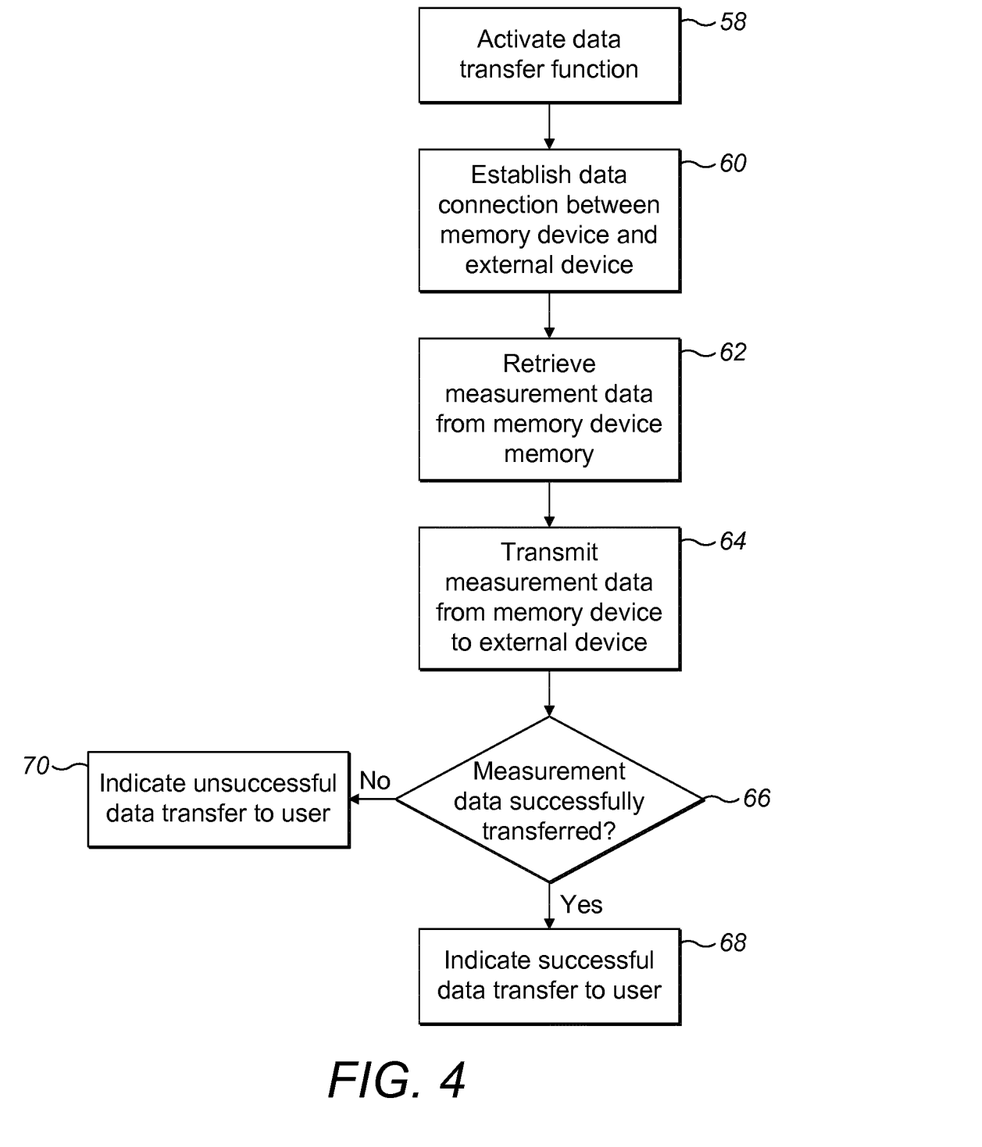
FIG. 4 shows a flowchart illustrating an example of a data transfer process from the memory device of FIG. 1 to an external device.

FIG. 4 shows a flowchart illustrating an example of a data transfer process from the memory device to an external device.

The measurement data stored in the memory device 2 can be transferred from the memory device 2 to an external device for processing. The external device may be a smartphone, a personal computer, a handheld computer, or any other data processing device.

The user first activates the data transfer function 58. The data transfer function 58 may be activated through an application running on the external device. Alternatively, it may be activated through the memory device 2. For example, it may be activated by pressing an activation key or button 18 on the memory device 2.

In embodiments where the measurement data is transferred from the memory device 2 to the external device by RFID or NFC, the data transfer function 58 may be activated by bringing the memory device 2 into proximity of an NFC transceiver/tag or RFID reader on the external device. The external device can send a request via the NFC transceiver/tag or RFID reader on the external device for transfer of sensor data stored in the memory device 2 to the external device. The request is received by the memory device 2 through the NFC transceiver 6 on the memory device 2. The request acts as a signal to activate the data transfer function.

In some embodiments, the user may request for specific measurement data to be transferred through an application on the external device.

Once the data transfer function is activated 58, a data connection is established 60 between the memory device 2 and the external device. The connection may be established via the network interface 38 on the memory device 2. It may take the form of a Bluetooth connection, a Wi-Fi connection, a RF connection, an IR connection or an acoustic connection. The data connection may allow for a bidirectional exchange of data between the memory device 2 and the external device. In embodiments where the data transfer function is activated by a NFC transceiver/tag or RFID reader on the external device, the data connection may be established via the NFC transceiver 6 on the memory device 2.

The processing arrangement 26 in the memory device then retrieves 62 measurement data from the non-volatile memory 32 of the memory device. The retrieved measurement data may be all measurement data currently stored on the memory device 2. Alternatively, in embodiments where the external device may request specific data, only the requested measurement data will be retrieved. Metadata associated with the measurement data may also be retrieved.

The retrieved measurement data is then transmitted 64 from the memory device 2 to the external device. Retrieved metadata associated with the measurement data may also be transmitted. The data transmission occurs over the data connection established 58 between the memory device 2 and the external device. For example, in embodiments where a data request from an external device has been received by the memory device 2 via the NFC transceiver 6 on the memory device 1, the measurement data may be sent from the memory device 2 to the external device across a NFC connection between the NFC transceiver 6 on the memory device 2 and a NFC transceiver/tag or RFID reader on the external device.

The success or failure of the data transfer is then determined 66. The external device may determine if the data transfer has been successful. Alternatively, the memory device 2 may determine if the data transfer has been successful.

If the data transfer has been successful, the success is indicated 68 to the user. The indication may be provided by the memory device 2. The indication may comprise a visual indication 68, such as a light 14 on the memory device 2 changing colour. For example, a light 14 on the memory device 2 may flash green to indicate successful data capture. The indication may comprise an aural indication provided by a speaker 16 on the memory device 2, such as a "bleep". In some embodiments, the indication 68 may be provided on the external device. For example, a "Capture complete" message may be provided to the user through a display on the external device.

In some embodiments, the measurement data stored in the memory device 2 may be deleted from the memory device 2 memory upon a successful data transfer. The deletion may occur automatically. Alternatively, deletion of the measurement data stored in the memory device 2 may be offered as an option through an application running on the external device. For example, the user may be presented with a message asking the user to indicate if they would like the measurement data to be deleted.

If the data transfer has been unsuccessful, the failure is indicated 70 to the user. The indication may be provided by the memory device 2. The indication may comprise a visual indication 68, such as a light 14 on the memory device 2 changing colour. For example, a light 14 on the memory device 2 may flash red to indicate a failure in the data capture. The indication may comprise an aural indication provided by a speaker 16 on the memory device 2, such as a "bleep". In some embodiments, the indication 68 may be provided on the external device. For example, a "Capture failed" message may be provided to the user through a display on the external device.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N- lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C, CM-3, GLP-1 Eligen, ORMD-0901, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, TT-401, BHM-034. MOD-6030, CAM-2036, DA-15864, ARI-2651, ARI-2255, Exenatide-XTEN and Glucagon-Xten.

An example of an oligonucleotide is, for example: mipomersen sodium (Kynamro®), a cholesterol-reducing antisense therapeutic for the treatment of familial hypercholesterolemia.

Examples of DPP4 inhibitors are Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present disclosure include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen. Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present disclosure, which encompass such modifications and any and all equivalents thereof.

The invention claimed is:

1. A portable medical memory device comprising: a battery storing battery power; a non-volatile memory; a near field communication transceiver; an activation key or button; and a network interface, wherein the portable medical memory device is configured to: transfer one or more commands from the portable medical memory device to a medical device via the near field communication transceiver in response to an activation of the activation key or button; transfer battery power from the battery to a sensor of the medical device via the near field communication transceiver to trigger a measurement by the sensor of the medical device in response to the activation of the activation key or button, and wherein the sensor is configured to, in response to receiving the battery power from the battery, measure the content of a medicament cartridge of the medical device to generate measurement data, obtain, from the medical device by using the near field communication transceiver, a medical device identifier and sensor data that includes the measurement data generated by the sensor in response to receiving the battery power, and tag the sensor data with the medical device identifier, a measurement date and measurement time to generate tagged sensor data, store the tagged sensor data in the non-volatile memory, send the tagged sensor data stored in the non-volatile memory to an external device via the near field communication transceiver in response to receiving an activation request, wherein the activation request comprises one or more of a request received at the near field communication transceiver from the external device or a further activation of the activation key or button on the memory device, wherein the near field communication transceiver is an RFID reader, and delete the tagged sensor data from the non-volatile memory upon a successful data transfer of the tagged sensor data to the external device.

2. The device of claim 1, wherein the sensor data comprises metadata relating to the measurement made by the sensor.

3. The device of claim 1, further comprising: a status indicator configured to indicate at least one of: a successful reading of the sensor data by the device, an unsuccessful reading of the sensor data by the device, a successful transfer of the sensor data to an external device, or an unsuccessful transfer of the sensor data to an external device.

4. The device of claim 3, wherein the status indicator is a visual indicator.

5. The device of claim 3, wherein the status indicator is an acoustic indicator.

6. The device of claim 3, wherein the status indicator is a vibrator.

7. The device of claim 1, wherein the device is in form of a keyring attachment.

8. A method of collecting and storing medical sensor data from a medical device comprising a medicament cartridge, the method comprising: transferring one or more commands from a portable medical memory device to the medical device via a near field communication transceiver of the portable medical memory device in response to an activation of an activation key or button of the portable medical memory device; transferring battery power from a battery of the portable medical memory device to a sensor of the medical device using the near field communication transceiver to trigger a measurement by the sensor of the medical device in response to the activation of the activation key or button, wherein the sensor is configured to, in response to receiving the battery power from the battery, measure the content of the medicament cartridge of the medical device to generate measurement data; and obtaining, from the medical device by using the near field communication transceiver, a medical device identifier and sensor data that includes the measurement data generated by the sensor in response to receiving the battery power, and tagging the sensor data with the medical device identifier, a measurement date and measurement time to generate tagged sensor data, storing the tagged sensor data in the non-volatile memory, establishing a data connection between the portable medical memory device and a data processing device; sending the tagged sensor data stored in the non-volatile memory to an external device via the near field communication transceiver in response to receiving an activation request, wherein the activation request comprises one or more of: a request received at the near field communication transceiver from the external device or a further activation of the activation key or button on the memory device, wherein the near field communication transceiver is an RFID reader, and deleting the tagged sensor data from the non-volatile memory upon a successful data transfer of the tagged sensor data to the external device.

9. The method of claim 8, further comprising: providing, through a status indicator, an indication to indicate at least one of: a successful reading of the sensor data, an unsuccessful reading of the sensor data, a successful transfer of the sensor data to an external device, or an unsuccessful transfer of the sensor data to the external device.

10. The method of claim 8, wherein transferring the battery power from the portable medical memory device to the sensor of the medical device using the near field communication transceiver comprises wirelessly transmitting the power from a transceiver to an RFID tag in a medical device associated with the medicament cartridge.

* * * * *